United States Patent
Pu et al.

(10) Patent No.: US 11,003,367 B2
(45) Date of Patent: May 11, 2021

(54) DATA STORAGE, READING, AND CLEANSING METHOD AND DEVICE, AND CLOUD STORAGE SYSTEM

(71) Applicant: HANGZHOU HIKVISION DIGITAL TECHNOLOGY CO., LTD., Hangzhou (CN)

(72) Inventors: Shiliang Pu, Hangzhou (CN); Guangkai Ding, Hangzhou (CN); Weichun Wang, Hangzhou (CN); Qiqian Lin, Hangzhou (CN); Wei Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/343,219

(22) PCT Filed: Sep. 15, 2017

(86) PCT No.: PCT/CN2017/101821
§ 371 (c)(1),
(2) Date: Apr. 18, 2019

(87) PCT Pub. No.: WO2018/072576
PCT Pub. Date: Apr. 26, 2018

(65) Prior Publication Data
US 2019/0250836 A1   Aug. 15, 2019

(30) Foreign Application Priority Data

Oct. 20, 2016   (CN) .................. 201610911405.X

(51) Int. Cl.
*G06F 3/06*   (2006.01)

(52) U.S. Cl.
CPC .......... *G06F 3/0631* (2013.01); *G06F 3/0604* (2013.01); *G06F 3/064* (2013.01);
(Continued)

(58) Field of Classification Search
CPC .... G06F 3/0631; G06F 3/0604; G06F 3/0605; G06F 3/0622; G06F 3/0637; G06F 3/064;
(Continued)

(56) References Cited

U.S. PATENT DOCUMENTS 6,526,521 B1   2/2003   Lim
9,325,791 B1   4/2016   Blahaerath et al.
(Continued)

FOREIGN PATENT DOCUMENTS

CN   101039278   9/2007
CN   103257958   8/2013
(Continued)

OTHER PUBLICATIONS

International Search Report and Written Opinion issued in International Patent Application No. PCT/CN2017/101821, dated Dec. 21, 2017.
(Continued)

*Primary Examiner* — Eric Cardwell
(74) *Attorney, Agent, or Firm* — Norton Rose Fulbright US LLP

(57) ABSTRACT

Disclosed are data storage, data reading, and data cleaning methods and devices, and a cloud storage system. Storage blocks of storage nodes are grouped into resource pools. A method can include: for each resource pool, determining a first number of occupied storage blocks in the resource pool (S401); determining whether the first number meets a preset data cleaning condition (S402); if so, sending a data cleaning instruction to a storage node where each occupied second storage block in the resource pool is located, such that the
(Continued)

storage node cleans the data stored on the second storage block in the storage node (S403). That is to say, the management node determines the number of occupied storage blocks of a resource pool. When the number meets a preset data cleaning condition, the data in the storage block is cleaned. Such a process is simple, reducing the workload of management node.

11 Claims, 3 Drawing Sheets

(52) U.S. Cl.
CPC ............ *G06F 3/0605* (2013.01); *G06F 3/067* (2013.01); *G06F 3/0622* (2013.01); *G06F 3/0637* (2013.01); *G06F 3/0652* (2013.01); *G06F 3/0659* (2013.01); *G06F 3/0664* (2013.01)

(58) Field of Classification Search
CPC .... G06F 3/0652; G06F 3/0659; G06F 3/0664; G06F 3/067
See application file for complete search history.

(56) References Cited

U.S. PATENT DOCUMENTS

| | | | |
|---|---|---|---|
| 9,411,973 B2 | 8/2016 | Factor et al. | |
| 2009/0157998 A1 | 6/2009 | Batterywala | |
| 2014/0038654 A1 | 2/2014 | Ahamadi | |
| 2014/0081911 A1* | 3/2014 | Deshpande | G06F 3/067 707/610 |
| 2014/0330869 A1 | 11/2014 | Factor et al. | |
| 2015/0199366 A1 | 7/2015 | Marlatt et al. | |
| 2016/0004481 A1* | 1/2016 | Lakshman | G06F 3/0665 711/114 |
| 2016/0219109 A1 | 7/2016 | Blahaerath et al. | |
| 2017/0063708 A1* | 3/2017 | Hsu | H04L 67/10 |

FOREIGN PATENT DOCUMENTS

| | | |
|---|---|---|
| CN | 104253865 | 12/2014 |
| CN | 104618482 | 5/2015 |
| CN | 105338027 | 2/2016 |
| CN | 105630419 | 6/2016 |
| CN | 105843557 | 8/2016 |
| WO | WO 2014/074316 | 5/2014 |

OTHER PUBLICATIONS

Extended European Search Report issued in corresponding European Patent Application No. 17862250.2, dated Sep. 20, 2019.
Extended European Search Report issued in corresponding European application No. 17862250.2, dated Jan. 31, 2020.
Office Action issued in Corresponding Chinese Patent Application No. 201610911405, dated May 20, 2019. (Translation Unavailable).
Dong, Feiyu. "Analysis of cloud platform architecture." *China New Telecommunications*, 24, pp. 46. (云平台构架浅析) (no English translation available).
Notification to Grant Patent Right for Invention issued in Corresponding Chinese Application No. 201610911405, dated Sep. 16, 2020 (English Translation provided).
Xue et al., "Cloud storage." *ZTE Technology Journal* 01, pp. 57-60 (云存储) (no English translation available).
Zhu, Xiaojing. "Design and application of virtual resource pool." *Technology and Enterprise*, 14, pp. 165. (虚拟资源池设计及应用) (no English translation available).
Office Action issued in Corresponding European Application No. 17862250.2, dated Dec. 10, 2020.

* cited by examiner

DATA STORAGE, READING, AND CLEANSING METHOD AND DEVICE, AND CLOUD STORAGE SYSTEM

CROSS-REFERENCE TO RELATED APPLICATIONS

The present application is a national phase under 35 U.S.C. § 371 of International Application No. PCT/CN2017/101821, filed Sep. 15, 2017, which claims priority to Chinese patent application No. 201610911405.X filed with the China National Intellectual Property Administration on Oct. 20, 2016 entitled "Data storage, reading, and cleansing method and device, and cloud storage system", each of which are incorporated herein by reference in their entirety.

TECHNICAL FIELD

The present application relates to the field of cloud storage, and in particular, to data storage, reading, and cleaning methods and devices, and a cloud storage system.

BACKGROUND

A cloud storage system includes a management node and storage nodes. The storage nodes are configured for storing data, and the management node is configured for managing data stored on each storage node in the system.

Generally, a storage node reports metadata of data stored thereon to the management node, and the management node manages the data stored on respective storage nodes according to the received metadata. Examples are described below.

When a device needs to store data to a storage node, the device sends a resource request to the management node. The management node allocates a storage node to the device according to the resource request and metadata reported by the storage nodes. The device then stores the data to the allocated storage node.

When the device needs to read data on the storage node, the device sends a resource query request to the management node. The management node determines, according to the resource query request and metadata reported by the storage nodes, path information of the storage node where the to-be-read data is located. The management node sends the path information to the device. The device reads the to-be-read data according to the path information.

In addition, the management node may calculate the remaining capacity of each storage node according to the metadata from the storage node. When the remaining capacity is lower than a preset threshold, the management node sends an instruction for data cleaning to the storage node. The storage node cleans data stored before a preset time point to such that the storage space may be reused.

In the above solution, the management node receives metadata sent by each storage node, calculates the remaining capacity of each storage node, and sends an instruction to each storage node. Such a process is very complicated, resulting in a heavy workload of the management node.

SUMMARY

The objective of the embodiments of the present application is to provide a data storage method, a data reading, and a data cleaning method and devices thereof, and a cloud storage system, to reduce the workload of the management node.

To achieve the above objective, an embodiment of the present application discloses a data storage method, which is applicable to a management node in a cloud storage system. The system further includes multiple storage nodes. Each storage node includes M storage blocks, and N storage blocks constitute one resource pool. The data storage method includes:

receiving a resource request containing identification information of a first resource pool from a first device;

allocating a first storage block in the first resource pool to the first device according to the resource request; and sending first path information of the first storage block to the first device, such that the first device stores to-be-stored data to the first storage block in the first resource pool according to the first path information.

Optionally, after receiving the resource request from the first device, the method further includes:

determining, according to first permission information stored in the management node, whether the first device has a permission to store data into the first resource pool; wherein the first permission information includes information on whether the first device has a permission to store data into a resource pool; and if so, performing the step of allocating the first storage block to the first device according to the resource request.

Optionally, allocating the first storage block to the first device according to the resource request includes:

determining whether the first resource pool is available;

if so, allocating the first storage block to the first device according to the resource request; and if not, determining a first domain where the first resource pool is located, wherein a domain consists of multiple resource pools;

determining a destination domain corresponding to the first domain according to a preset rule, and determining a second resource pool in the destination domain;

sending prompt information carrying identification information of the second resource pool to the first device; and adding a permission for the first device to store data into the second resource pool.

To achieve the above objective, an embodiment of the present application further discloses a data reading method, which is applicable to a management node in a cloud storage system. The system further includes multiple storage nodes. Each storage node includes M storage blocks, and N storage blocks constitute one resource pool. The data reading method includes:

receiving a resource query request containing identification information of to-be-read data from a second device;

determining a destination resource pool where the to-be-read data is located and a destination storage block where the to-be-read data is located in the destination resource pool is located; and sending identification information of the destination resource pool and second path information of the destination storage block to the second device, such that the second device reads the to-be-read data from the destination storage block in the destination resource pool according to the identification information and the second path information.

Optionally, after the determining a destination resource pool in which the to-be-read data is located, the method may further include:

determining, according to a second permission information stored in the management node, whether the second device has a permission to read data from the destination resource pool; wherein the second permission information includes the information on whether the second device has the permission to read data from a resource pool; and if so, performing the step of determining the destination storage block where the to-be-read data is located in the destination resource pool.

Optionally, the method may further include:

upon receiving a preset instruction to add a permission for the second device to read data from a second resource pool, adding the permission for the second device to read data from the second resource pool.

To achieve the above objective, an embodiment of the present application further discloses a data cleaning method, which is applicable to a management node in a cloud storage system. The system further includes multiple storage nodes. Each storage node includes M storage blocks, and N storage blocks constitute one resource pool. The data in the storage block is stored according to the data storage method of claim 1. The data cleaning method includes:

for each resource pool, determining a first number of occupied storage blocks in the resource pool;

determining whether the first number meets a preset data cleaning condition; and if so, sending a data cleaning instruction to a storage node where each occupied second storage block in the resource pool is located, such that the storage node cleans data stored in the second storage block in the storage node.

Optionally, determining whether the first number meets the preset data cleaning condition, may include:

determining whether the first number is greater than a first preset threshold, and if so, determining that the preset data cleaning condition is met;

or, calculating a resource utilization rate of the resource pool using the first number; and determining whether the resource utilization rate is greater than a second preset threshold, and if so, determining that the preset data cleaning condition is met.

Optionally, calculating the resource utilization rate of the resource pool using the first number includes:

calculating a second number of storage blocks available in the resource pool; and calculating a resource utilization rate of the resource pool using the first number and the second number.

Optionally, sending a data cleaning instruction to a storage node where each occupied second storage block in the resource pool is located, may include:

determining an earliest storage time and a latest storage time of data stored in each occupied second storage block;

determining a target time in a time period between the earliest storage time and the latest storage time; and sending a data cleaning instruction carrying the target time to the storage node where the second storage block is located, such that the storage node deletes target data stored in the second storage block in the storage node, wherein the target data is data stored before the target time.

Optionally, after sending a data cleaning instruction to a storage node where each occupied second storage block is located, the method may further include:

recording a sending time when the data cleaning instruction is sent; and after the sending time, each time when a preset time period elapses, performing the step of sending the data cleaning instruction to a storage node where each occupied second storage block is located.

To achieve the above objective, an embodiment of the present application further discloses a data storage device, which is applicable to a management node in a cloud storage system. The system further includes multiple storage nodes. Each storage node includes M storage blocks, and N storage blocks constitute one resource pool. The data storage device includes:

a first receiving module, configured for receiving a resource request containing identification information of a first resource pool from a first device;

an allocating module, configured for allocating a first storage block in the first resource pool to the first device according to the resource request; and a first sending module, configured for sending first path information of the first storage block to the first device, such that the first device stores to-be-stored data to the first storage block in the first resource pool according to the first path information.

Optionally, the device may further include:

a first judging module, configured for determining, according to first permission information stored in the management node, whether the first device has a permission to store data into the first resource pool; wherein the first permission information includes information on whether the first device has a permission to store data into a resource pool; and if so, triggering the allocating module.

Optionally, the allocating module may include:

a first judging module, configured for determining whether the first resource pool is available; if so, triggering an allocating sub-module, and if not, triggering a determining sub-module;

the allocating sub-module, configured for allocating the first storage block to the first device according to the resource request;

the determining sub-module, configured for determining a first domain where the first resource pool is located, wherein a domain consists of multiple resource pools; determining a destination domain corresponding to the first domain according to a preset rule, and determining a second resource pool in the destination domain;

a sending sub-module, configured for sending prompt information carrying identification information of the second resource pool to the first device; and an adding sub-module, configured for adding a permission for the first device to store data into the second resource pool.

To achieve the above objective, an embodiment of the present application further discloses a data reading device, which is applicable to a management node in a cloud storage system, The system further includes multiple storage nodes, Each storage node includes M storage blocks, and N storage blocks constitute one resource pool. The data reading device includes:

a second receiving module, configured for receiving a resource query request containing identification information of to-be-read data from a second device;

a first determining module, configured for determining a destination resource pool where the to-be-read data is located and a destination storage block where the to-be-read data is located in the destination resource pool; and a second sending module, configured for sending identification information of the destination resource pool and second path information of the destination storage block to the second device, such that the second device reads the to-be-read data from the destination storage block in the destination resource pool according to the identification information and the second path information.

Optionally, the device may further include:

a second judging module, configured for determining, according to second permission information stored in the management node, whether the second device has a permission to read data from the destination resource pool; wherein the second permission information includes information on whether the second device has a permission to read data from a resource pool; and if so, triggering the first determining module.

Optionally, the device may further include:

an adding module, configured for adding, upon receiving a preset instruction to add a permission for the second device to read data from a third resource pool, the permission for the second device to read data from the third resource pool.

To achieve the above objective, an embodiment of the present application further discloses a data cleaning device, which is applicable to a management node in a cloud storage system. The system further includes multiple storage nodes. Each storage node includes M storage blocks, and N storage blocks constitute one resource pool. The data in the storage block is stored on the data storage device of claim 13. The data cleaning device includes:

a second determining module, configured for determining, for each resource pool, a first number of occupied storage blocks in the resource pool;

a third judging module, configured for determining whether the first number meets a preset data cleaning condition; and if so, triggering a third sending module; and the third sending module, configured for sending a data cleaning instruction to a storage node where each occupied second storage block in the resource pool is located, such that the storage node cleans data stored in the second storage block in the storage node.

Optionally, the third judging module may include: a second judging sub-module, or a calculating sub-module and a third judging sub-module.

The second judging sub-module is configured for determining whether the first number is greater than a first preset threshold, and if so, determining that the preset data cleaning condition is met.

The calculating sub-module is configured for calculating a resource utilization rate of the resource pool using the first number.

The third judging sub-module is configured for determining whether the resource utilization rate is greater than a second preset threshold, and if so, determining that the preset data cleaning condition is met.

Optionally, the calculating sub-module, may be specially configured for:

calculating a second number of storage blocks available in the resource pool; and calculating a resource utilization rate of the resource pool using the first number and the second number.

Optionally, the third sending module, may be specially configured for:

determining an earliest storage time and a latest storage time of data stored in each occupied second storage block;

determining a target time in a time period between the earliest storage time and the latest storage time; and sending a data cleaning instruction carrying the target time to the storage node where the second storage block is located, such that the storage node deletes target data stored in the second storage block in the storage node, wherein the target data is data stored before the target time.

Optionally, the device may further include:

a recording module, configured for recording a sending time when the data cleaning instruction is sent; and a timing module, configured for, after the sending time, triggering the third sending module each time when a preset time period elapses.

To achieve the above objective, an embodiment of the present application further discloses a data storage system, which includes: a management node, multiple storage nodes. Each storage node includes M storage blocks, and N storage blocks constitute one resource pool.

The management node is configured for receiving a resource request containing identification information of a first resource pool from a first device; allocating a first storage block in the first resource pool to the first device according to the resource request; and sending first path information of the first storage block to the first device, such that the first device stores to-be-stored data to the first storage block in the first resource pool according to the first path information.

Optionally, the management node may be further configured for receiving a resource query request containing identification information of to-be-read data from a second device; determining a destination resource pool where the to-be-read data is located and a destination storage block where the to-be-read data is located in the destination resource pool; and sending identification information of the destination resource pool and second path information of the destination storage block to the second device, such that the second device reads the to-be-read data from the destination storage block in the destination resource pool according to the identification information and the second path information.

Optionally, the management node may be further configured for, for each resource pool, determining a first number of occupied storage blocks in the resource pool; determining whether the first number meets a preset data cleaning condition; and if so, sending a data cleaning instruction to a storage node where each occupied second storage block in the resource pool is located, such that the storage node cleans data stored in the second storage block in the storage node.

To achieve the above objective, an embodiment of the present application further discloses an electronic device including a processor, a communication interface, a memory and a communication bus. The processor, the communication interface and the memory communicate with each other via the communication bus.

The memory is configured for storing a computer program.

The processor is configured for implement any of the data storage method, data reading method, and data cleaning method by executing the program stored on the memory.

To achieve the above objective, an embodiment of the present application further discloses a computer readable storage medium having a computer program stored thereon. The computer program, when executed by a processor, implements any of the data storage method, data reading method, and data cleaning method described above.

To achieve the above objective, an embodiment of the present application further discloses a computer program that, when executed, implements any of the data storage method, data reading method, and data cleaning method described above.

With the embodiments of the present application, storage blocks in storage nodes are grouped into resource pools. The data is stored, read, or cleaned in units of resource pools, thereby reducing the workload of management. In particular, during data cleaning, only data in each resource pool is cleaned. Specifically, for each resource pool, the first number of occupied storage blocks in the resource pool is determined. If the first number meets a preset data cleaning condition, a data cleaning instruction will be sent to the storage node where each occupied second storage block in the resource pool is located, such that the storage node cleans data stored in the second storage block in the storage node. That is, a management node determines the number of occupied storage blocks in a resource pool. When the number meets the preset data cleaning condition, the data in the storage block in the resource pool is cleaned. Such a process is simple, reducing the workload of the management node.

BRIEF DESCRIPTION OF THE DRAWINGS

In order to more clearly describe the technical solutions of the embodiments of the application and the prior art, drawings for the embodiments and the prior art will be briefly described below. Obviously, the drawings described below are for only some embodiments of the present application. One of ordinary skills in the art can also obtain other drawings based on the drawings herein without any creative efforts.

DETAILED DESCRIPTION

In order to make the objective, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

Figure 1:
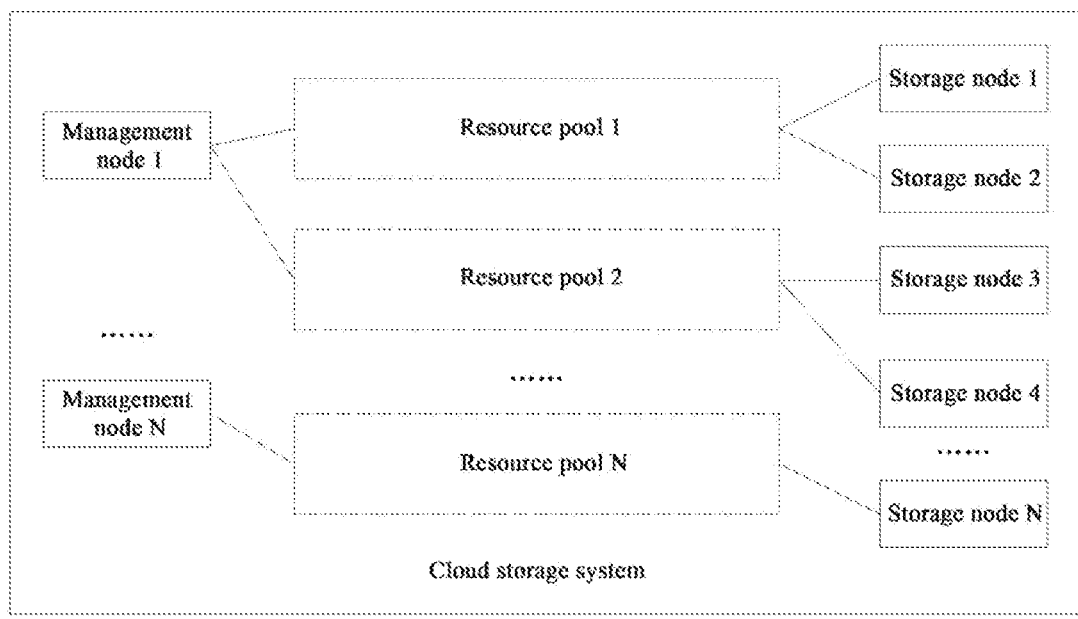
FIG. 1 is a diagram depicting the structure of a cloud storage system according to an embodiment of the present application.

In order to solve the technical problem above, embodiments of the present application provide data storage, reading, and cleaning methods and devices, and a cloud storage system. The cloud storage system may include management nodes and a plurality of storage nodes (storage node 1, storage node 2, storage node 3, storage node 4, . . . , and storage node N) as shown in FIG. 1. Each storage node includes M storage blocks. N storage blocks constitute one resource pool. That is to say, a storage node may be virtualized into storage blocks with virtualization technologies. N storage blocks constitute one resource pool, and the management node manages the data in each resource pool.

In this embodiment, the values of M and N may be set according to actual condition. M may be greater than, less than, or equal to N. There is no strict correspondence between the storage nodes and the resource pools. For example, three storage blocks of the storage node 1 and four storage blocks of the storage node 2 may constitute one resource pool. Another three storage blocks of the storage node 1, another two storage blocks of the storage node 2, and two storage blocks of the storage node 3 may constitute one resource pool, and so on.

Alternatively, for example, all storage blocks of multiple storage nodes may constitute one resource pool, which is not limited herein.

Alternatively, the cloud storage system may include multiple management nodes, which is not limited herein.

The data storage, cleaning, reading methods and devices are applicable to a management node in the cloud storage system. The data storage method according to an embodiment of the present application is first described in detail below.

Figure 2:
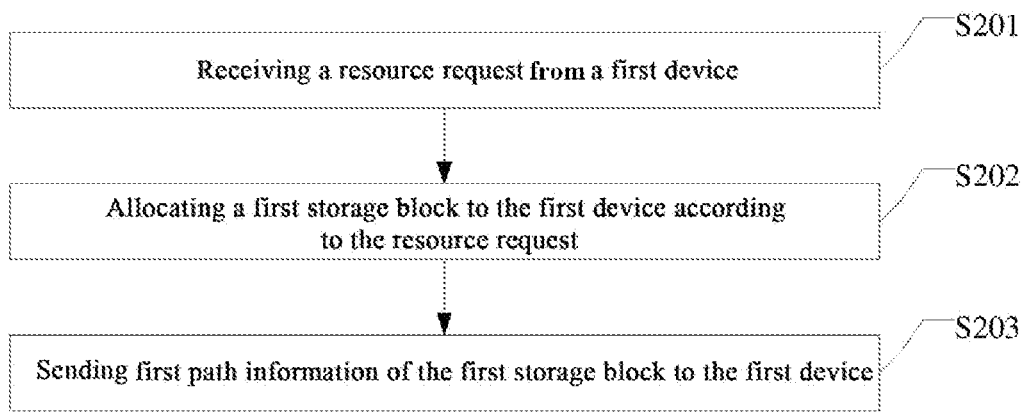
FIG. 2 is a schematic flow chart depicting a data storage method according to an embodiment of the present application.

FIG. 2 is a schematic flow chart depicting a data storage method according to an embodiment of the present application. The data storage method includes S201-S203.

S201: receiving a resource request containing identification information of a first resource pool from a first device.

The first device may be, but not limited to, an image acquisition device, or another device, such as a computer, used by the user. When the first device needs to store data into the storage node, the first device first sends a resource request to the management node, to request a storage block in a resource pool to store the data. It should be noted that, the first device may obtain identification information of resource pools obtained in advance, and determines identification information of a first resource pool for storing the data of the first device. The determined identification information is carried in the resource request sent to the management node.

S202: allocating a first storage block in the first resource pool to the first device according to the resource request.

For example, the identification information of the first resource pool carried in the resource request sent by the first device may be 1, namely, the first resource pool is resource pool 1. The management node allocates a first storage block in the resource pool 1 to the first device. The resource pool 1 may include 20 storage blocks, and the first storage block allocated by the management node to the first device may be the storage block 5.

S203: sending first path information of the first storage block to the first device, such that the first device stores to-be-stored data into the first storage block in the first resource pool according to the first path information.

For the above example, the management node sends the path information of the storage block 5 to the first device. The first device stores the date to be stored to the storage block 5 in the resource pool 1 according to the path information of the storage block 5.

In an implementation of the present application, the management node may store first permission information. The first permission information may include information about whether the first device has the permission to store data into each resource pool. Thus, after receiving the resource request from the first device, the management node may first determine, according to the first permission information, whether the first device has the permission to store data into the first resource pool. If the first device has the permission to store data into the first resource pool, a first storage block is allocated to the first device; otherwise, the embodiment of the method may end, or a prompt message such as "no permissions" may be sent to the first device.

For example, in the first permission information stored on the management node, the permission for the first device to store data is: data from the first device can be stored only on the resource pool 1 and the resource pool 2. After receiving the resource request from by the first device, the management node determines that the first device has the permission to store data into the first resource pool (i.e., resource pool 1). As a result, the management node performs S202 and S203 noted above.

Such a permission noted above may be understood as a binding. For example, the first device is bound to the resource pool 1 and the resource pool 2. The data from the first device can only be stored into the resource pool 1 and the resource pool 2. Therefore, the management node may store the permission that the first device can store data into the resource pool 1 and the resource pool 2 may be stored. Such binding may be set according to actual needs. Establishing a binding between a device and a resource pool or resource pools may control the amount of data from the device to be stored to the resource pool(s).

In an implementation of the present application, the process that the management node allocates the first storage block to the first device may include:
  determining whether the first resource pool is available;
  if so, allocating a first storage block to the first device according to the resource request; and
  otherwise,
    determining a first domain in which the first resource pool is located, wherein the domain consists of multiple resource pools;
    determining a destination domain corresponding to the first domain according to a preset rule, and determining a second resource pool in the destination domain;
    sending prompt information to the first device, which carries identification information of the second resource pool; and
    adding a permission for the first device to store data into the second resource pool.

It should be noted that, in this implementation, multiple resource pools may form one domain. There are various ways to form a domain. For example, a domain may be composed of resource pools belonging to a same network segment form one domain, or a domain may be formed according to geographical regions, which is not limited herein.

When the first resource pool requested by the first device is unavailable, the management node determines the domain in which the first resource pool is located, which is called a first domain herein. In general, if the first resource is unavailable, most of the resource pools in the first domain are unavailable.

Therefore, the management node may determine the destination domain corresponding to the first domain according to the preset rule. Specifically, the destination domain may be a domain adjacent or close to the first domain. For example, the domain in which the first resource pool is located is domain A, domain A is closest to domain B in terms of geographical regions. In this case, domain B may be determined as the destination domain. Alternatively, the preset rule may also be, for example, another domain in a network segment adjacent to the network segment of domain A is determined as the destination domain, which is not limited herein.

The management node determines the second resource pool in domain B, and sends the prompt information to the first device. The prompt information carries the identification information of the second resource pool. Further, the management node also needs to add a binding between the first device and the second resource pool. That is, a permission allowing the first device to store data into the second resource pool is added to the first type of rights information stored on the management node.

With this implementation, a dispersion of data may be controlled. If the requested resource pool is unavailable, it can be ensured that the data can be stored into a domain that is adjacent to or close to the requested resource pool, thereby avoiding additional pressure on the network due to excessive discrete of data.

With the embodiment of the present application shown in FIG. 2, storage blocks of storage nodes are formed into resource pools. The management node manages the data in units of resource pools, allowing for an easy management.

Figure 3:
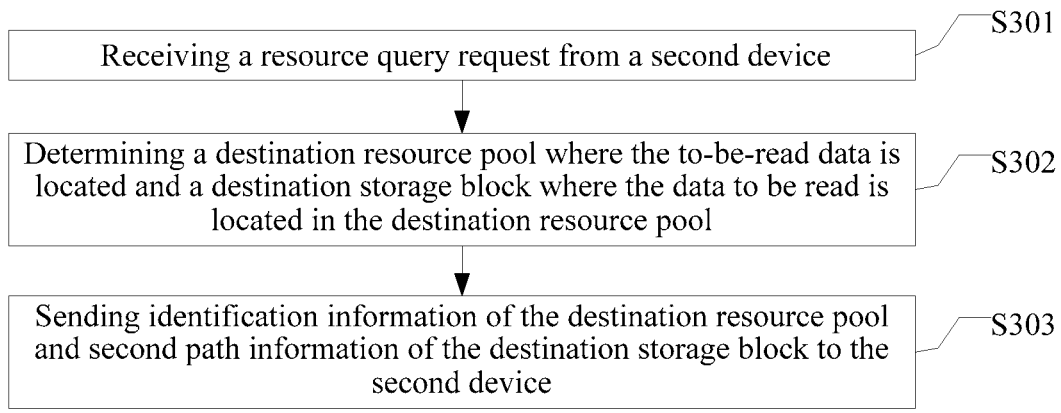
FIG. 3 is a schematic flow chart depicting a data reading method according to an embodiment of the present application.

FIG. 3 is a schematic flow chart depicting a data reading method according to an embodiment of the present application. The data reading includes S301-S303.

S301: receiving a resource query request containing identification information of to-be-read data from a second device.

The second device may be, but not limited to, a computer or other terminal device used by the user. When the second device needs to read data, the second device first sends a resource query request to the management node, to request a storage location of the to-be-read data. The resource query request carries the identification information of the to-be-read data, so as to allow the management node to determine the storage location of the to-be-read data according to the identification information.

S302: determining a destination resource pool where the to-be-read data is located and a destination storage block where the data to be read is located in the destination resource pool.

As described above, the management node determines, according to the identification information of the to-be-read data carried in the received resource query request, the destination resource pool and the destination storage block where the to-be-read data is located. For example, the destination resource pool is resource pool 1, the destination storage block is storage block 5 in the resource pool 1.

In an implementation, the management node may store second permission information. The second permission information may include information about whether the second device has the permission to read data from resource pools. In this way, after determining the destination resource pool, the management node may first determine, according to the second permission information, whether the second device has the permission to read data from the target resource pool. If the second device has the permission to read data from the target resource pool, the management node then determines the destination storage block; otherwise, the process ends, or a prompt message such as "no permissions" may be sent to the first device.

The permission described above may be understood as a binding, for example, the second device is bound to the resource pool 1, the resource pool 2, the resource pool 3, and the resource pool 4. The first device may read data from these four resource pools. Thus, the management node may store a permission that the second device can read data from the resource pool 1, the resource pool 2, the resource pool 3 and the resource pool 4. Such bindings may be set according to actual needs.

It should be noted that, the binding in the embodiment of FIG. 3 may be different from the binding in the embodiment of FIG. 2. That is, the permission that a device can store data into a resource pool may be different from the permission that the device can read data from that resource pool. For example, a device can read data from the resource pool 3, but it cannot store data into the resource pool 3.

In an implementation, the management node may modify the permission that the second device stored thereon can read data from the resource pool. Specifically, upon receiving an instruction to add a permission for a preset second device to read data from the second resource pool, the management node may add the permission for this second device to read data from the second resource pool.

If the management node adds a permission for data storage for a device in a way as shown in FIG. 2, a permission for the device to read data should be modified correspondingly.

For example, the permission for the device A in the second permission information stored on the management node is: the device A can store data into the resource pool 1 and the resource pool 2; and the device A can read data from the resource pool 1, the resource pool 2, the resource pool 3 and the resource pool 4. If the management node later adds a permission that the device A can store data into the resource pool 5, the management node should also add a permission that the device A can read data from the resource pool 5 to the second permission information stored on the management node, or add a permission that the device A and other devices can read data from the resource pool 5. The "other devices" here may be other preset devices that are allowed to read data from the resource pool 5. The specific permissions to be added may be determined according to actual needs, which is not limited herein.

S303: sending identification information of the destination resource pool and second path information of the destination storage block to the second device, such that the second device read the to-be-read data from the destination storage block in the destination resource pool according to the identification information and the second path information.

For the above example, it is assumed that the destination resource pool is the resource pool 1, and the destination storage block is the storage block 5 in the resource pool 1. The management node sends the identification information of the resource pool 1 and the second path information of the storage block 5 to the second device. The second device read the to-be-read data from the storage block 5 in the resource pool 1.

With the embodiment of the present application shown in FIG. 3, storage blocks of storage nodes form resource pools. The management node manages data in units of resource pools for ease of management.

Figure 4:
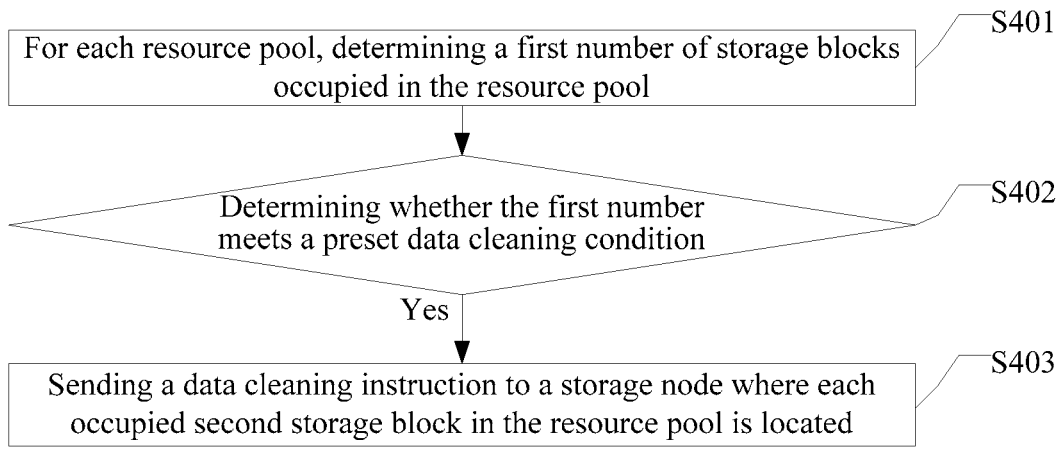
FIG. 4 is a schematic flow chart depicting a data cleaning method according to an embodiment of the present application.

FIG. 4 is a schematic flow chart depicting a data cleaning method according to an embodiment of the present application. The data cleaning method includes S401-S403.

S401: for each resource pool, determining a first number of storage blocks occupied in the resource pool.

In an embodiment of the present application, a storage node may be virtualized into storage blocks with virtualization technologies. The capacity of each storage block may be equal to each other, for example, each storage block has a capacity of such as 64 MB. Alternatively, the capacity of the storage blocks may be different. N storage blocks constitute one resource pool. The storage node may periodically report its usage information to the management node. The usage information may include the identification of each storage block included in the storage node, the identification of the occupied storage blocks, and the like.

The management node determines the first number of the occupied storage blocks in each resource pool according to the information reported by storage nodes.

S402: determining whether the first number meets a preset data cleaning condition, and if so, the method proceeds to S403.

In an implementation, it may determine whether the first number is greater than a first preset threshold. If so, the preset data cleaning condition is met. The first preset threshold may be set according to actual needs.

In another implementation, a resource utilization rate of the resource pool is calculated according to the first number. It may determine whether the resource utilization rate is greater than a second preset threshold, and if so, the preset data cleaning condition is met.

It should be noted that, there may be the case that not many storage blocks are occupied in a resource pool, but most of the storage blocks of this resource pool are unavailable. In this case, the resource pool should still be cleaned.

In this case, the number of the storage blocks available in the resource pool may be calculated as the second number. The resource utilization rate of the resource pool is calculated using the first number and the second number. The second preset threshold may be set according to actual needs.

Alternatively, another way may also be utilized to determine whether the resource pool needs to be cleaned. For example, each storage block has a capacity of 64 MB, the consumption of the first resource pool may be calculated as the first number of * 64 MB. The total capacity of the first resource pool may be calculated as the number of storage blocks in the first resource pool * 64 MB. The difference between the total capacity and the consumption may be calculated as the remaining capacity of the first resource pool. A threshold for the remaining capacity may be set. If the remaining capacity is less than the set threshold, it is determined that the resource pool needs to be cleaned. Other ways are also possible.

S403: sending a data cleaning instruction to a storage node where each occupied second storage block in the resource pool is located, such that the storage node cleans the data stored on the second storage block in the storage node.

As described above, a storage node reports the identifier or identifiers of the occupied storage block or storage blocks of this storage node to the management node. The management node may determine each occupied second storage block in the resource pool, and may determine the storage node where the second storage block is located. The management node sends a data cleaning instruction to the storage node where each second storage block is located. Upon receiving the instruction, the storage node cleans the data stored on the second storage block.

The information that a storage node reports to the management node may also include an earliest storage time and a latest storage time when data is stored to the storage node. After the occupied second storage block is determined, the management node may determine the earliest storage time and the latest storage time when data is stored to the second storage block.

For example, the management node determines that the storage blocks occupied in the resource pool 1 is the storage block 3, storage block 6, and storage block 10. The earliest storage time when data is stored into the storage block 3 is Aug. 10, 2015, and the latest storage time is Aug. 9, 2016.

The earliest storage time when data is stored into the storage block 6 is Jan. 1, 2016, and the latest storage time is Aug. 15, 2016. The earliest storage time when data is stored into the storage block 10 is May 4, 2015, and the latest storage time is Jul. 6, 2016.

The management node may determine a target time between the earliest storage time and the latest storage time. There are various ways to determine the target time. For example, the intermediate time between the earliest storage time and the latest storage time is determined as a target time, or a time a few months later than the earliest storage time is determined as the target time, or a time a few months earlier than the latest storage time is determined as the target time, which is not limited herein.

For example, the time of 4 months later than the earliest storage time is determined as the target time. Thus, the target time for the storage block 3 is determined as Dec. 10, 2015, the target time for the storage block 6 is determined as May 1, 2016, and the target time for the storage block 10 is determined as Sep. 4, 2015.

The management node sends data cleaning instructions to the storage node or storage nodes where the storage node 3, the storage block 6 and the storage block 10 are located, respectively. The target time carried in the data cleaning instruction sent to the storage node where the storage block 3 is located is Dec. 10, 2015. The storage node where the storage block 3 is located deletes the data that is stored into the storage block 3 before Dec. 10, 2015. Similarly, the target time carried in the data cleaning instruction sent to the storage node where the storage block 6 is located is May 1, 2016, and the storage node where the storage block 6 is located will delete the data that is stored into the storage block 6 before May 1, 2016. The target time carried in the data cleaning instruction sent to the storage node where the storage block 10 is located is Sep. 4, 2015, and the storage node where the storage block 10 is located will delete the data that is stored into the storage block 10 before Sep. 4, 2015.

In an implementation of the present application, the management node may record the sending time when a data cleaning instruction is sent. After the sending time, each time when a preset period elapses, the data cleaning instruction is sent to the storage node where the second storage block corresponding to this sending time is located.

Taking the storage block 3 as an example, after the management node sends the data cleaning instruction to the storage node where the storage block 3 is located, the management node records the sending time when the instruction is sent, which may be for example Aug. 17, 2016. For example, the preset period is one month. The management node sends a data cleaning instruction to the storage node where the storage block 3 is located every other month, such that the storage node cleans the data stored in the storage block 3.

With the embodiments of the present application shown in FIG. 4, storage blocks in storage nodes form one resource pool. The data is stored, read, or cleaned in units of resource pools, thereby reducing the workload of management. In particular, during data cleaning, only data in each resource pool is cleaned up. Specifically, for each resource pool, the first number of occupied storage blocks in the resource pool is determined. If the first number meets a preset data cleaning condition, a data cleaning instruction will be sent to the storage node where each occupied second storage block in the resource pool is located, such that the storage node cleans data stored in the second storage block in the storage node. That is, a management node determines the number of occupied storage blocks in a resource pool. When the number meets the preset data cleaning condition, the data in the storage block in the resource pool is cleaned. Such a process is simple, reducing the workload of the management node.

Corresponding to the method embodiments above, the present application further provides data storage, cleaning, and reading devices.

Figure 5:
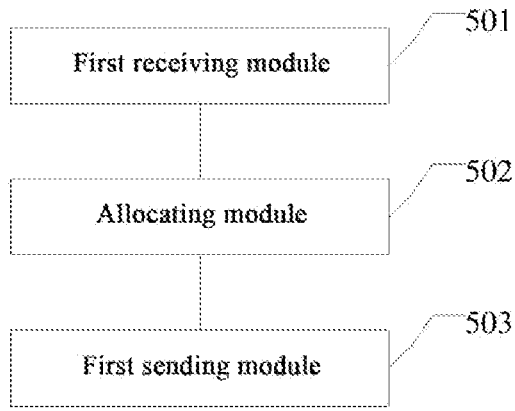
FIG. 5 is a diagram depicting the structure of a data storage device according to an embodiment of the present application.

FIG. 5 is a diagram depicting the structure of a data storage device according to an embodiment of the present application. The data storage device includes:

a first receiving module 501, configured for receiving a resource request containing identification information of a first resource pool form a first device;

an allocating module 502, configured for allocating a first storage block in the first resource pool to the first device according to the resource request; and a first sending module 503, configured for sending first path information of the first storage block to the first device, such that the first device stores to-be-stored data to the first storage block in the first resource pool according to the first path information.

In the embodiment, the device may further include:

a first judging module (not shown in the figure), configured for determining, according to first permission information stored in the management node, whether the first device has a permission to store data into the first resource pool; wherein the first permission information includes information on whether the first device has a permission to store data into a resource pool; and if so, triggering the allocation module 502.

In the embodiment, the allocation module 502 may include: a first judging sub-module, an allocating sub-module, a determining sub-module, a sending sub-module, and an adding sub-module (not shown in the figure).

The first judging module is configured for determining whether the first resource pool is available; if so, triggering an allocating sub-module, and if not, triggering a determining sub-module.

The allocating sub-module is configured for allocating the first storage block to the first device according to the resource request.

The determining sub-module is configured for determining a first domain where the first resource pool is located, wherein a domain consists of multiple resource pools; determining a destination domain corresponding to the first domain according to a preset rule, and determining a second resource pool in the destination domain.

The sending sub-module is configured for sending prompt information carrying identification information of the second resource pool to the first device.

The adding sub-module is configured for adding a permission for the first device to store data into the second resource pool.

With the embodiment of the present application shown in FIG. 5, storage blocks in storage nodes are grouped into resource pools. The management node manages data in units of resource pools resulting in an easy management.

Figure 6:
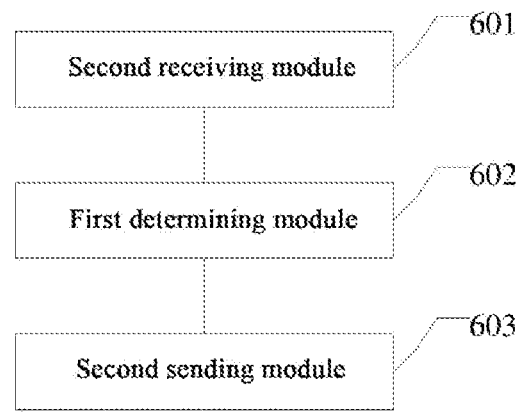
FIG. 6 is a diagram depicting the structure of a data reading device according to an embodiment of the present application.

FIG. 6 is a diagram depicting the structure of a data reading device according to an embodiment of the present application. The data reading device includes:

a second receiving module 601, configured for receiving a resource query request containing identification information of to-be-read data from a second device;

a first determining module 602, configured for determining a destination resource pool where the to-be-read data is located and a destination storage block where the to-be-read data is located in the destination resource pool; and a second sending module 603, configured for sending identification information of the destination resource pool and second path information of the destination storage block to the second device, such that the second device reads the to-be-read data from the destination storage block in the destination resource pool according to the identification information and the second path information.

In the embodiment, the management node stores a permission for the second device to read data from a resource pool. The device may also include:

a second judging module (not shown in the figure), configured for determining, according to second permission information stored in the management node, whether the second device has a permission to read data from the destination resource pool; wherein the second permission information includes information on whether the second device has a permission to read data from a resource pool; and if so, triggering the first determining module 602.

In the embodiment, the device may further include:

an adding module (not shown in the figure), configured for adding, upon receiving a preset instruction to add a permission for the second device to read data from a third resource pool, the permission for the second device to read data from the third resource pool.

With the embodiment of the present application shown in FIG. 6, storage blocks in storage nodes are grouped into resource pools The management node manages data in units of resource pools for ease of management.

Figure 7:
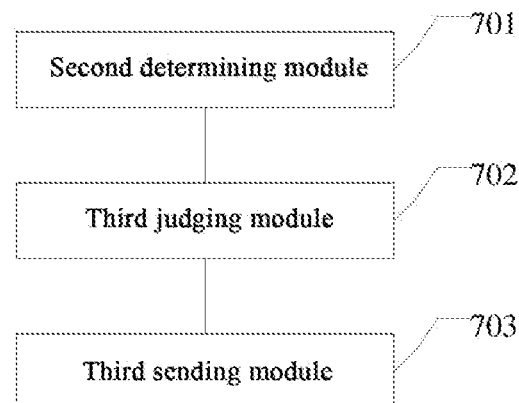
FIG. 7 is a diagram depicting the structure of a data cleaning device according to an embodiment of the present application.

FIG. 7 is a diagram depicting the structure of a data cleaning device according to an embodiment of the present application. The data cleaning device includes:

a second determining module 701, configured for determining, for each resource pool, a first number of occupied storage blocks in the resource pool;

a third judging module 702, configured for determining whether the first number meets a preset data cleaning condition; and if so, triggering a third sending module 703; and the third sending module 703, configured for sending a data cleaning instruction to a storage node where each occupied second storage block in the resource pool is located, such that the storage node cleans data stored in the second storage block in the storage node.

In the embodiment, the third judging module 702 may include: a second judging sub-module, or a calculating sub-module and a third judging sub-module (not shown in the figure).

The second judging sub-module is configured for determining whether the first number is greater than a first preset threshold, and if so, determining that the preset data cleaning condition is met.

The calculating sub-module is configured for calculating a resource utilization rate of the resource pool using the first number.

The third judging sub-module is configured for determining whether the resource utilization rate is greater than a second preset threshold, and if so, determining that the preset data cleaning condition is met.

In the embodiment, the calculating sub-module may be specially configured for:

calculating a second number of storage blocks available in the resource pool; and calculating a resource utilization rate of the resource pool using the first number and the second number;

In the embodiment, the third sending module 703 is specially configured for:

determining an earliest storage time and a latest storage time of data stored in each occupied second storage block;

determining a target time in a time period between the earliest storage time and the latest storage time; and sending a data cleaning instruction carrying the target time to the storage node where the second storage block is located, such that the storage node deletes target data stored in the second storage block in the storage node, wherein the target data is data stored before the target time.

In the embodiment, the device may further include: a recording module and a timing module (not shown in the figure).

The recording module is configured for recording a sending time when the data cleaning instruction is sent.

The timing module is configured for, after the sending time, triggering the third sending module 703 each time when a preset time period elapses.

With the embodiments of the present application shown in FIG. 7, storage blocks in a storage node are formed into one resource pool. The data is stored, read, or cleaned in units of resource pools, thereby reducing the workload of management. In particular, during data cleaning, only data on each resource pool is cleaned. Specifically, for each resource pool, the first number of occupied storage blocks in the resource pool is calculated. If the first number meets a preset data cleaning condition, a data cleaning instruction is sent to the storage node where each occupied second storage block in the resource pool is located, such that the storage node cleans data stored in the second storage block in the storage node. That is to say, a management node determines the number of occupied storage blocks of a resource pool. When the number meets the preset data cleaning condition, the data in the storage block in the resource pool is cleaned Such a process is simple, reducing the workload of management node.

An embodiment of the present application further provides a cloud storage system, as shown in FIG. 1, including: a management node, multiple storage nodes (storage node 1, storage node 2, storage node 3, storage node 4, . . . , and storage node N). Alternatively, the cloud storage system may also include multiple management nodes, which are not limited herein. Each storage node includes M storage blocks, and N storage blocks constitute one resource pool.

The management node is configured for receiving a resource request containing identification information of a first resource pool from a first device; allocating a first storage block in the first resource pool to the first device according to the resource request; and sending first path information of the first storage block to the first device, such that the first device stores to-be-stored data to the first storage block in the first resource pool according to the first path information.

In the embodiment, the management node may be further configured for receiving a resource query request containing identification information of to-be-read data from a second device; determining a destination resource pool where the to-be-read data is located and a destination storage block where the to-be-read data is located in the destination resource pool; and sending identification information of the destination resource pool and second path information of the destination storage block to the second device, such that the second device reads the to-be-read data from the destination storage block in the destination resource pool according to the identification information and the second path information.

In the embodiment, the management node may be further configured for, for each resource pool, determining a first number of occupied storage blocks in the resource pool; determining whether the first number meets a preset data cleaning condition; and if so, sending a data cleaning instruction to a storage node where each occupied second storage block in the resource pool is located, such that the storage node cleans data stored in the second storage block in the storage node.

With the embodiments of the present application, storage blocks in storage nodes are grouped into resource pools. The data is stored, read, or cleaned in units of resource pools, thereby reducing the workload of management. In particular, during data cleaning, only data in each resource pool is cleaned. Specifically, for each resource pool, the first number of occupied storage blocks in the resource pool is determined. If the first number meets a preset data cleaning condition, a data cleaning instruction will be sent to the storage node where each occupied second storage block in the resource pool is located, such that the storage node cleans data stored in the second storage block in the storage node. That is, a management node determines the number of occupied storage blocks in a resource pool. When the number meets the preset data cleaning condition, the data in the storage block in the resource pool is cleaned. Such a process is simple, reducing the workload of the management node.

Figure 8:
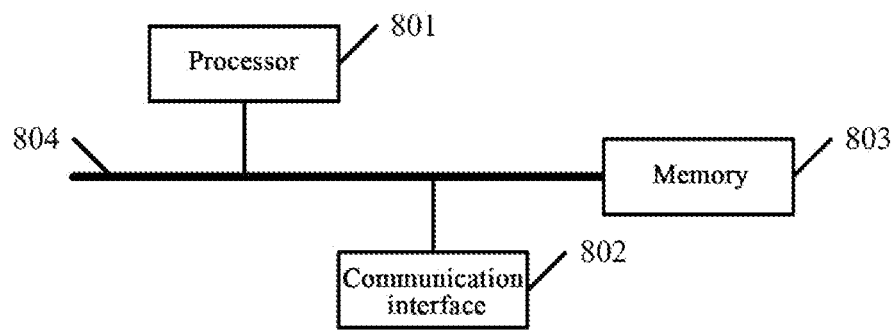
FIG. 8 is a schematic diagram of the structure of an electronic device according to an embodiment of the present application.

An embodiment of the present application further provides an electronic device, as shown in FIG. 8, which includes a processor 801, a communication interface 802, a memory 803 and a communication bus 804. The processor 801, the communication interface 802 and the memory 803 communicate with each other via the communication bus 804.

The memory 803 is configured for storing computer program.

The processor 801 is configured for, by executing the program stored in the memory 803, implement any of the data storage method of the embodiment shown in FIG. 2, the data reading method of the embodiment shown in FIG. 3, and the data cleaning method of the embodiment shown in FIG. 4.

An embodiment of the present application further provides a computer readable storage medium having a computer program stored thereon. The computer program, when executed by a processor, implements the data storage method of the embodiment shown in FIG. 2, the data reading method of the embodiment shown in FIG. 3, and the data cleaning method of the embodiment shown in FIG. 4.

An embodiment of the present application further provides a computer program that, when executed, implements the data storage method of the embodiment shown in FIG. 2, the data reading method of the embodiment shown in FIG. 3, and the data cleaning method of the embodiment shown in FIG. 4.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "include" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized in one embodiment are differences from that of other embodiments. In particular, the embodiment of the data storage device shown in FIG. 5 is substantially similar to that of the data storage method shown in FIG. 2. The embodiment of the data reading device shown in FIG. 6 is substantially similar to that of the data reading method shown in FIG. 3. The embodiment of the data cleaning device shown in FIG. 7 is substantially similar to that of the data cleaning method shown in FIG. 4. The embodiments of the electronic device shown in FIG. 8 are substantially similar to those of the data storage method shown in FIG. 2, of the data reading method shown in FIG. 3, and of the data cleaning method shown in FIG. 4. The embodiments of the above computer readable storage medium are substantially similar to those of the data storage method shown in FIG. 2, of the data reading method shown in FIG. 3, and of the data cleaning method shown in FIG. 4. The embodiments of the above computer program embodiment are substantially similar to those of the data storage method shown in FIG. 2, of the data reading method shown in FIG. 3, and of the data cleaning method shown in FIG. 4. Therefore, the embodiments of each device, the embodiments of the electronic device, the embodiments of the computer readable storage medium, and the embodiments of the computer program are simply described, and the related parts may refer to the description of the embodiments of the methods.

It will be understood by those of ordinary skills in the art that all or some of the steps in the methods described above may be accomplished by a program to instruct the associated hardware. Said program may be stored in a computer-readable storage medium, such as ROMs/RAMs, magnetic disks, optical disks, etc.

The description is only for preferred embodiments of the present application, and embodiments are not so limited. Any modifications, substitutions, improvements, etc., which are made within the spirit and principles of the present application, will fall into the protection scope of the present application.

The invention claimed is:

1. A data storage method, applicable to a management node in a cloud storage system, wherein the system further comprises multiple storage nodes, each storage node comprises M storage blocks, and N storage blocks constitute one resource pool, wherein each storage block is obtained from virtualization of a storage node, the method comprising:
receiving a resource request containing identification information of a first resource pool from a first device;
allocating a first storage block in the first resource pool to the first device according to the resource request; and
sending first path information of the first storage block to the first device, such that the first device stores to-be-stored data to the first storage block in the first resource pool according to the first path information,
wherein multiple resource pools form one domain, when the first resource pool in a first domain requested by the first device is unavailable, determining a destination domain corresponding to the first domain and binding the first device with the second resource pool in the destination domain, wherein the second domain is a domain that belongs to a same network segment as the first domain or that is closest to the second domain in terms of geographical regions.

2. The method of claim 1, wherein after receiving the resource request from the first device, the method further comprises:
determining, according to first permission information stored in the management node, whether the first device has a permission to store data into the first resource pool; wherein the first permission information comprises information on whether the first device has a permission to store data into a resource pool; and
if so, performing the step of allocating the first storage block to the first device according to the resource request.

3. The method of claim 2, wherein allocating the first storage block to the first device according to the resource request, comprises:
determining whether the first resource pool is available;
if so, allocating the first storage block to the first device according to the resource request; and
if not, determining a first domain where the first resource pool is located, wherein a domain consists of multiple resource pools;
determining a destination domain corresponding to the first domain according to a preset rule, and determining a second resource pool in the destination domain;
sending prompt information carrying identification information of the second resource pool to the first device; and
adding a permission for the first device to store data into the second resource pool.

4. A data reading method, applicable to a management node in a cloud storage system, wherein the system further comprises multiple storage nodes, each storage node includes M storage blocks, and N storage blocks constitute one resource pool, wherein each storage block is obtained from virtualization of a storage node, the method comprising:
receiving a resource query request containing identification information of to-be-read data from a second device;
determining a destination resource pool where the to-be-read data is located and a destination storage block where the to-be-read data is located in the destination resource pool; and
sending identification information of the destination resource pool and second path information of the destination storage block to the second device, such that the second device reads the to-be-read data from the destination storage block in the destination resource pool according to the identification information and the second path information,
wherein multiple resource pools form one domain, when the first resource pool in a first domain requested by the first device is unavailable, determining a destination domain corresponding to the first domain and binding the first device with the second resource pool in the destination domain, wherein the second domain is a domain that belongs to a same network segment as the first domain or that is closest to the second domain in terms of geographical regions.

5. The method of claim 4, wherein after determining the destination resource pool where the to-be-read data is located, the method further comprises:
determining, according to second permission information stored in the management node, whether the second device has a permission to read data from the destination resource pool;
wherein the second permission information comprises information on whether the second device has a permission to read data from a resource pool; and
if so, performing the step of determining the destination storage block where the to-be-read data is located in the destination resource pool.

6. The method of claim 5, further comprising:
upon receiving a preset instruction to add a permission for the second device to read data from a second resource pool, adding the permission for the second device to read data from the second resource pool.

7. A cloud storage system, comprising a management node and multiple storage nodes, wherein each storage node comprises M storage blocks, and N storage blocks constitute one resource pool, wherein each storage block is obtained from virtualization of a storage node;
the management node is configured for receiving a resource request containing identification information of a first resource pool from a first device; allocating a first storage block in the first resource pool to the first device according to the resource request; and sending first path information of the first storage block to the first device, such that the first device stores to-be-stored data to the first storage block in the first resource pool according to the first path information,
wherein multiple resource pools form one domain, when the first resource pool in a first domain requested by the first device is unavailable, determining a destination domain corresponding to the first domain and binding the first device with the second resource pool in the destination domain, wherein the second domain is a domain that belongs to a same network segment as the first domain or that is closest to the second domain in terms of geographical regions.

8. The system of claim 7, wherein
the management node is further configured for receiving a resource query request containing identification information of to-be-read data from a second device; determining a destination resource pool where the to-be-read data is located and a destination storage block where the to-be-read data is located in the destination resource pool; and sending identification information of the destination resource pool and second path information of the destination storage block to the second device, such that the second device reads the to-be-read data from the destination storage block in the destination resource pool according to the identification information and the second path information.

9. The system of claim 7, wherein
the management node is further configured for, for each resource pool, determining a first number of occupied storage blocks in the resource pool; determining whether the first number meets a preset data cleaning condition; and if so, sending a data cleaning instruction to a storage node where each occupied second storage block in the resource pool is located, such that the storage node cleans data stored in the second storage block in the storage node.

10. A non-transitory computer readable storage medium having instructions stored thereon that, when executed by a processor, implement steps of the method of claim 1.

11. A non-transitory computer readable storage medium having instructions stored thereon that, when executed by a processor, implement steps of the method of claim 4.

* * * * *